R. C. SAYER.
AEROSTATICS.
APPLICATION FILED JUNE 13, 1910.

1,019,368.

Patented Mar. 5, 1912.

Witnesses
C. Schallinger
C. Rehm

Inventor
Robert Cooke Sayer
By B. Singer
Atty

COLUMBIA PLANOGRAPH CO., WASHINGTON, D. C.

UNITED STATES PATENT OFFICE.

ROBERT COOKE SAYER, OF REDLAND, BRISTOL, ENGLAND.

AEROSTATICS.

1,019,368. Specification of Letters Patent. Patented Mar. 5, 1912.

Application filed June 13, 1910. Serial No. 566,644.

*To all whom it may concern:*

Be it known that I, ROBERT COOKE SAYER, a subject of the King of Great Britain and Ireland, residing at Clyde Road, Redland, Bristol, England, have invented certain new and useful Improvements in Aerostatics, of which the following is a specification.

The object of the present invention is to lighten bodies by a central vacuum retained by a periphery formed of adjacent continuous chambered or tube cells containing fluid pressure.

The invention essentially consists of a hollow body of any form, and material, a peripheral external skin inside and a series or group of cells in contact with the skin and one another; the hollow body is exhausted so as to form a vacuum within it lighter than atmospheric air, and atmospheric air or a very light gas is compressed into the cells of the periphery to resist the compressive effect of the vacuum and external fluid by its tightening the skin down to the cells, the cells against one another, and their sides against their contained compressed fluid, and thereby maintain the form of the body; the cells are arranged in lengths which may or may not be connected by valves; hollow passages or chambers may connect the peripheral sides, or ends of the body, to let adjacent external fluid and its pressure pass through them and by the vacuum act in tension upon their intrados or walls, which may be regulated by doors or valves.

The invention is disclosed by the accompanying drawing wherein—

Figure 1:
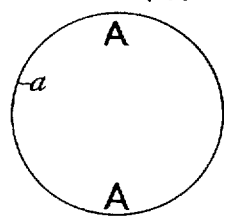
Figure 2:
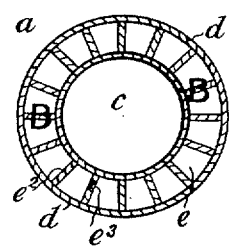
Figure 3:
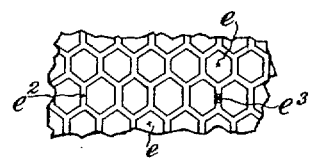
Figure 4:
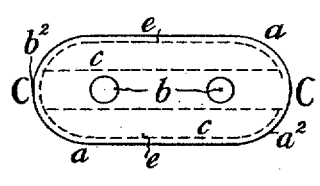
Figure 5:
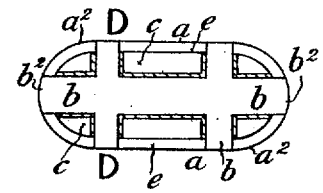
Figure 6:
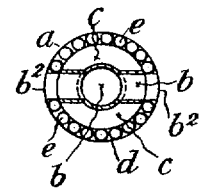
Figure 7:
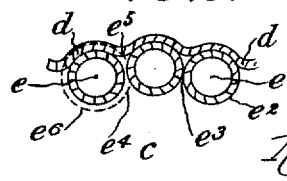

Figure 1 represents a typical sphere in elevation; Fig. 2 is a section on the line A—A Fig. 1; Fig. 3 is a developed section on the line B—B Fig. 2; Fig. 4 is an elevation of a tubular body with strut passages; Fig. 5 is a sectional plan on the line C—C Fig. 4; Fig. 6 is a section on the line D—D Fig. 5; Fig. 7 is an enlarged section in part the same as Fig. 6.

*Detail description.*—Referring now particularly to the drawing:—$a$ Figs. 1, 2, 3 shows typically the invention adapted for a sphere; Figs. 4 to 7 showing the same adapted for a tube or ellipse having hollow passages $b$ connecting its sides and ends, through which may pass external adjacent fluid in which the body $a$ may be floating, to act against and put their walls or sides in tension and enable them to act as struts to the periphery, with or without valves or doors $b^2$.

The bodies $a$ may be of any material, have a hollow interior $c$, a peripheral exterior skin $d$, inside which, Figs. 1 to 3, are arranged chambered cells $e$ of any form, a few, or all, being connected, if desired, through their walls $e^2$ at $e^3$, and in part formed by the skin $d$; or alternatively Figs. 4 to 7 the periphery is formed by straight, or spiral, zig-zag, transverse, or (as shown) longitudinal tubular cells $e$ in many lengths which may or may not be connected by valves; or in one length arranged for their walls $e^2$ to normally touch one another at $e^3$. The tubular cells have occasional apertures $e^4$ between them, formed by spacing members, or rings $e^6$ on the tubes $e$, enabling the vacuum and external fluid to act on the skin $d$ at $e^5$, as well as on the tubes $e$ which may vary in diameter to form the curved ends $a^2$ (Fig. 4), or elliptical or other shaped bodies $a$, so as to taper at the ends or from their center, and maintain contact with each other and the skin $d$; or the tubes may be of uniform diameter and be flattened toward their ends $a^2$ for the same.

The bodies $a$ may be long and straight, or curved tubes with closed ends, or with their ends connected to form a ring; and in all cases form the whole, or a part only of any shaped body, to lighten or strengthen it, give it flotation or upholding by acting as ribs, or otherwise; the essential feature being a vacuum to lighten the body $a'$ for the external fluid to compress together the parts of a cellular periphery containing fluid pressure of the lightest nature, adapted to maintain the form of the body $a$.

I claim—

1. A body for aerial navigation having a central vacuum, and having a series of adjacently disposed chambers or cells arranged along its outer periphery, each of said chambers or cells containing a gas under pressure.

2. A body for aerial navigation having a central vacuum, and having a series of adjacently disposed chambers or cells arranged along its outer periphery, each of said chambers or cells containing a gas under pressure, and valve openings arranged so as to afford communication between adjacent cells.

3. A body for aerial navigation having a series of adjacently disposed chambers or cells arranged along its outer periphery, each of said chambers or cells containing a gas under pressure, a passageway through said body to admit external fluid, and said body being formed with a vacuum in the space between said passageway and said chambers or cells.

4. A body for aerial navigation having a series of adjacently disposed chambers or cells arranged along its outer periphery, each of said chambers or cells containing a gas under pressure, a passageway from end to end of said body for admitting external fluid, laterally arranged passageways passing across said first-named passageway, and said body being formed with a vacuum in the space between said passageways and said chambers or cells.

5. A body for aerial navigation having a series of adjacently disposed longitudinal tubular chambers arranged along its outer periphery, each of said chambers containing a gas under pressure, and a chamber surrounded by said tubular chambers having a vacuum therein.

6. A body for aerial navigation having a central vacuum, and having a series of adjacently disposed longitudinal tubular chambers arranged along its outer periphery, each of said chambers containing a gas under pressure, a portion of said tubular chambers contacting with each other, and a portion being spaced apart from each other.

7. A body for aerial navigation having a series of adjacently disposed longitudinal tubular chambers arranged along its outer periphery, each of said chambers containing a gas under pressure, a portion of said chambers contacting laterally with each other while a portion are spaced apart a suitable distance, a passageway extending from end to end of said body to admit external fluid, and said body being formed with a vacuum in the space between said passageway and said tubular chambers.

In testimony whereof I have affixed my signature, in presence of two witnesses.

ROBERT COOKE SAYER.

Witnesses:
E. J. BUSSELL,
L. TAYLOR.

---

Copies of this patent may be obtained for five cents each, by addressing the "Commissioner of Patents, Washington, D. C."